United States Patent [19]

Gulette et al.

[11] Patent Number: 4,479,677
[45] Date of Patent: Oct. 30, 1984

[54] PICKUP TRUCK TONNEAU COVER

[75] Inventors: Ronald S. Gulette, Farmington Hills; Mark Lobanoff, Troy, both of Mich.

[73] Assignee: Irvin Industries, Madison Heights, Mich.

[21] Appl. No.: 549,322

[22] Filed: Nov. 7, 1983

Related U.S. Application Data

[63] Continuation of Ser. No. 389,256, Jun. 17, 1982, abandoned.

[51] Int. Cl.³ .............................................. B60J 7/06
[52] U.S. Cl. ...................................... 296/98; 296/100; 160/23 R
[58] Field of Search ................ 296/98, 100; 160/23 R

[56] References Cited

U.S. PATENT DOCUMENTS

| 3,146,824 | 9/1964 | Veilleux | 296/98 |
| 3,829,154 | 8/1974 | Becknell | 296/98 |
| 4,168,096 | 9/1979 | Langston | 296/100 |
| 4,285,539 | 8/1981 | Cole | 296/100 |
| 4,335,915 | 6/1982 | Knapp | 296/98 |

FOREIGN PATENT DOCUMENTS 83022 4/1964 France .

Primary Examiner—Robert R. Song

[57] ABSTRACT

Tonneau cover for box of pickup truck, stored within housing mounted on the front end of box on spring actuated windup spool when not in use, extends over cross bows and snaps closed along edge of box. Cross rod at exposed end facilitates unrolling, serves as weight for open tailgate and stabilizes automatic roll-up when unsnapped and released.

3 Claims, 7 Drawing Figures

PICKUP TRUCK TONNEAU COVER

This application is a continuation of Ser. No. 389,256 filed June 17, 1982, now abandoned.

BACKGROUND OF THE INVENTION

Prior art tonneau covers for pickup trucks conventionally snap into position over the box opening and are simply folded up and stowed within the box compartment or driver's cab when not in use. Such covers are somewhat bulky and awkward to fold and unfold, become creased from storage and on the whole are relatively inconvenient and time consuming to use.

SUMMARY OF THE PRESENT INVENTION

Utilizing the basic principle of a spring wound windowshade the present tonneau cover includes a front end housing for storage with a front seal providing a watershed for the cover when not in use as well as for the box compartment when the cover is pulled out and snapped in place. Application of the cover is facilitated and reduced to the simple operation of pulling the cover backwards, snapping it over the tailgate and completing the side snaps which are all conveniently in proximate position as held stretched between the windup roller and tha tailgate.

In order to remove and store the tonneau cover the sides are unsnapped and the end unsnapped from the tailgate and released for automatic windup within the storage housing. Optional intermediate cross bows are provided to enhance watershed when the cover is in use.

DETAILED DESCRIPTION OF THE DRAWINGS

Figure 1:
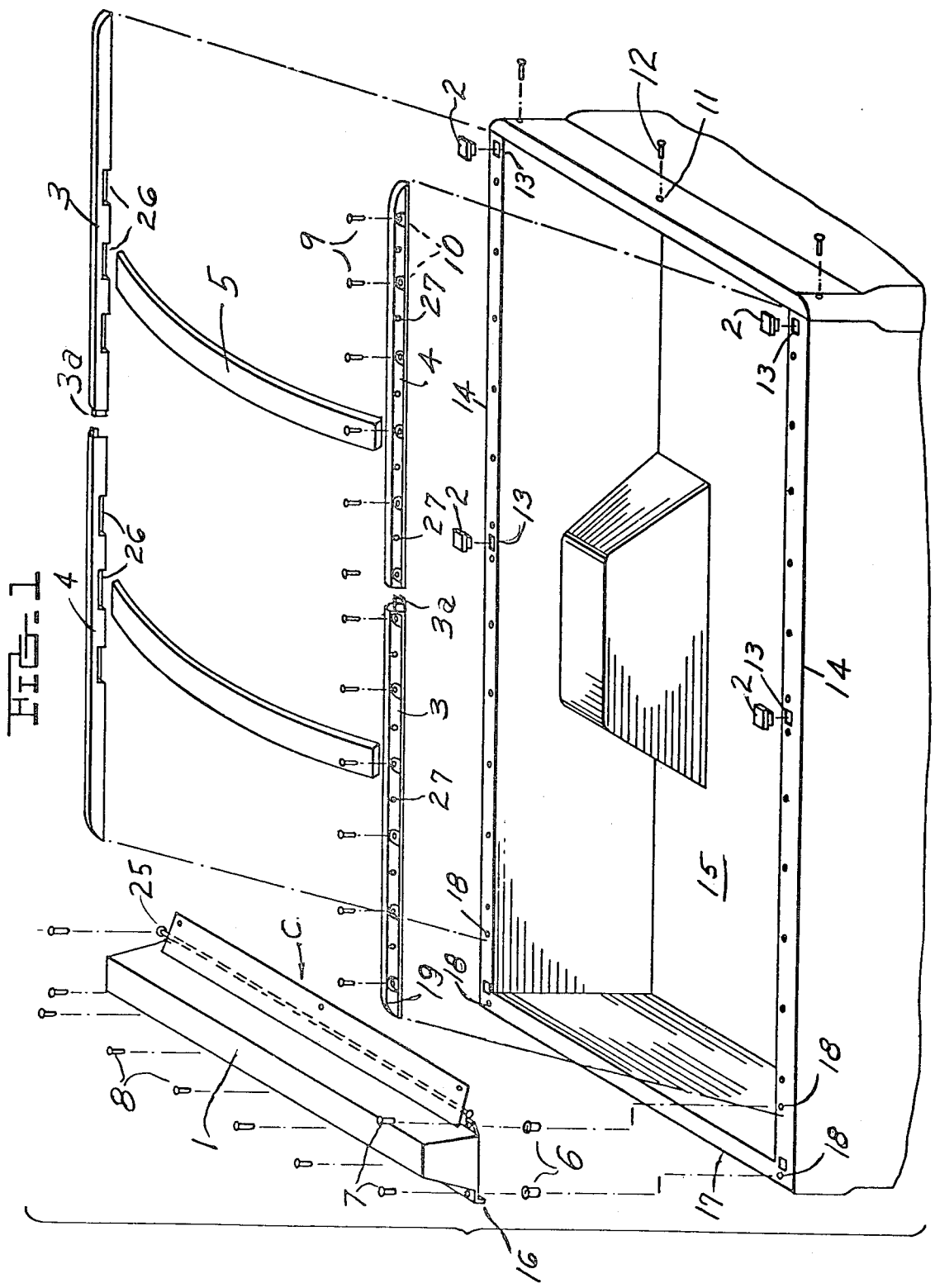
FIG. 1 is an exploded perspective view of the components of the complete assembly in relation to the open box of a typical pickup truck.

Tonneau cover assembly 1 comprises a plastic housing for a spring actuated windup roller 28 for tonneau cover C, preferably made of a vinyl impervious to the elements which will not shrink or stretch, and having a transverse rod to facilitate pulling the cover open weighting the cover when the tailgate is open and assisting to effect smooth proper cover windup for storage as later explained in further detail. Components for installation include four stake pocket covers 2; two identical rail sections 3 with male tongues 3a; two additional identical rail sections 4; plural wood bows 5; four well nuts 6; four threaded bolts 7; five sheet metal screws 8; twenty-four threaded bolts 9 with lock nuts 10; three snap studs 11; and three sheet metal screws 12.

Installation involves the following steps:

1. Snap four stake pocket covers 2 in last two pockets 13 on each 14 of pickup box 15.

Figure 2:
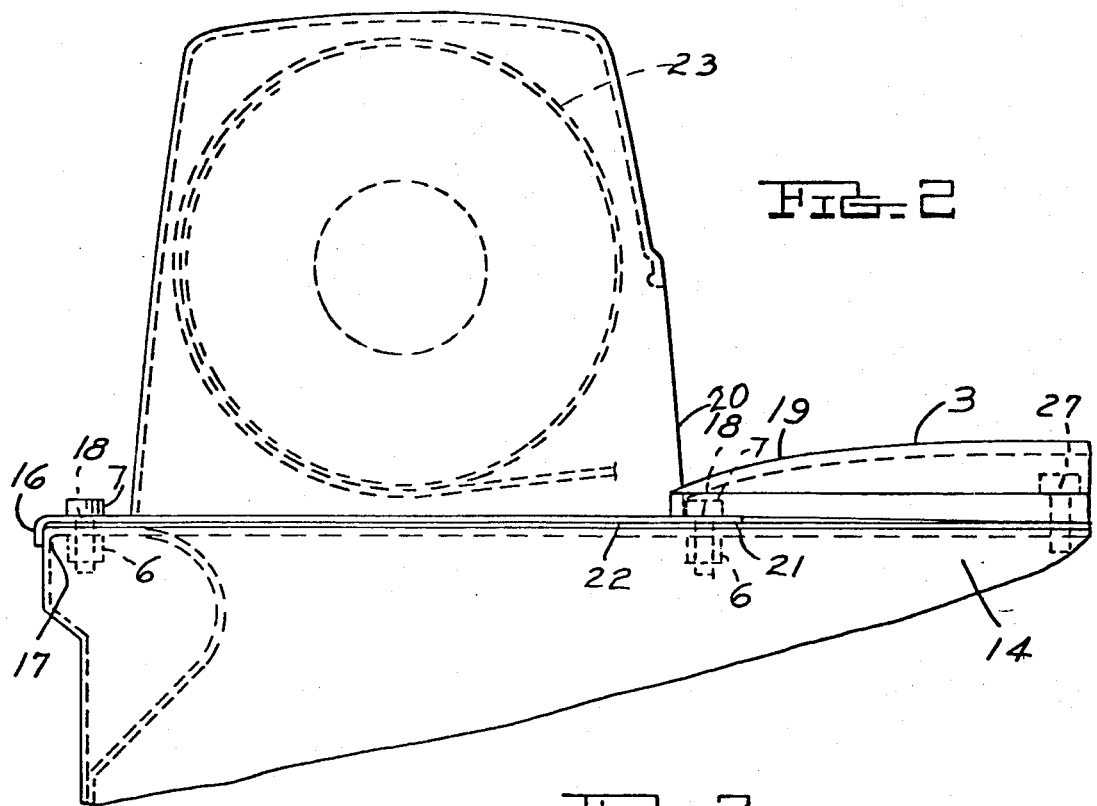
FIG. 2 is a fragmentary enlarged end elevation.

2. Place tonneau assembly 1 at front of pickup box with flange 16 overhanging forward edge 17 with flange of tonneau assembly pulled tightly against forward edge of box. Locations for seven holes are marked with punch on the forward edge and one at each side spaced rearwardly of the forward edge. The tonneau assembly is removed and five holes drilled for sheet metal screws 8 as well as four holes 18 for weld nut 6 insertion. The tonneau assembly 1 is then placed in position and installed with five sheet metal screws 8 at the front and four machine bolts 7 two at each end as best shown in FIG. 2.

3. Install rail sections 3 and 4 tapered end 19 abutting against cover at 20 and inboard flanges 21 of bracket 22 at end of roller assembly 23. With rail section 3 on the left driver's side and section 4 on the right side bow pockets 26 will face inwardly. The other two rail sections 3 and 4 are next installed with mating fit into the forward rail sections. The distance between rails at the bracket on the roller end is measured and the rails adjusted to this dimension throughout their length. Mounting holes are next drilled and bolts 9 installed with lock nuts 10 at each side progressively toward the rear of the unit.

4. Bows 5 are next placed in position and the tonneau cover manually pulled out with the use of cross rod 25 to a position where the first snap on the tonneau engages the last snap on the rails. This establishes the proper overhang at the tailgate for installing three male snap studs 11. Location for a snug fit is marked and a hole drilled for the center snap first; then for right and left snaps, again for snug fit, using sheet metal screws 12.

This completes installation of the kit at which time the cover may be snapped into position with side snaps 27 along each side together with the three snaps at the rear. To store the cover side snaps are loosened and, while holding the tonneau at the rear, release of the three snaps will permit the tonneau to roll up inside the cover. For access to the rear of the truck only three snaps need be opened. Cross rod 25 serves to weight the rear flap when the tailgate is left open as well as to maintain the cover spread to facilitate rolling and unrolling at the spring actuated windup roller. The rod also limits the windup entry of the tonneau cover within the housing to leave an exposed end for manual pull out.

Figure 5:
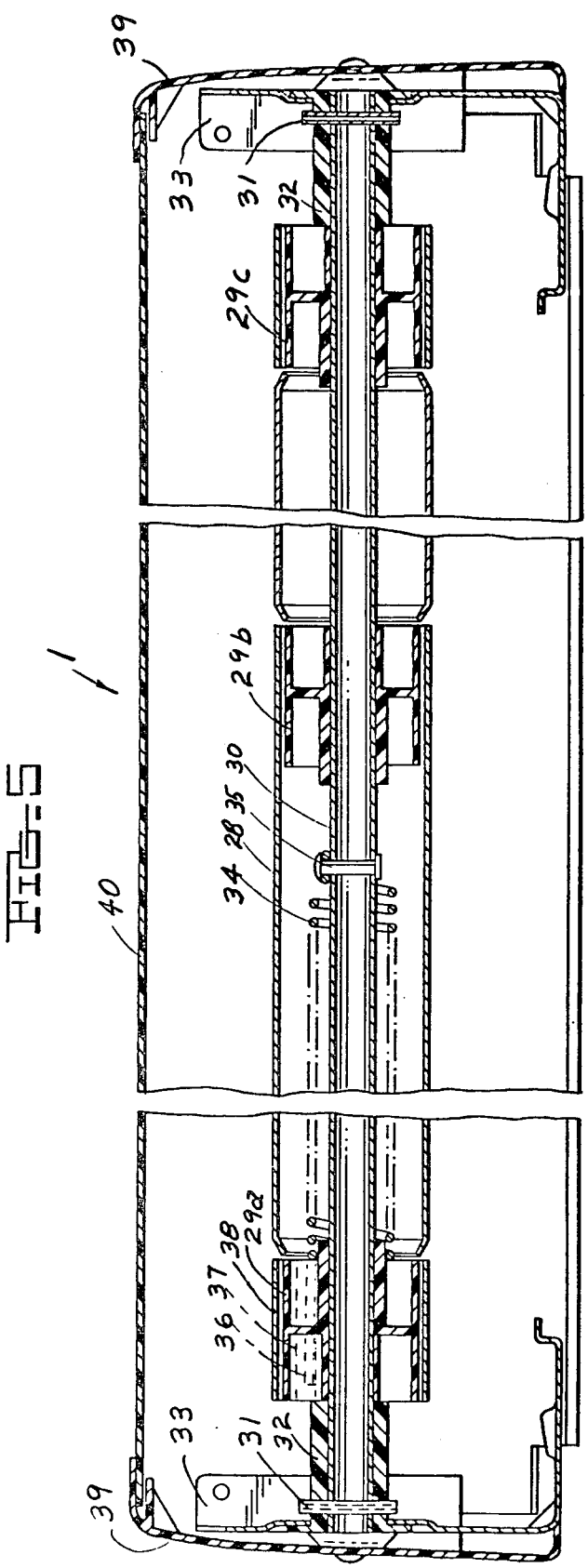
FIG. 5 is a sectional view of the cover and windup roller mechanism shown in FIG. 2.

With reference to FIG. 5 the tonneau assembly 1, shown in the figure with cover fabric C omitted, includes roller tube 28 mounted on three bearings 29a, 29b and 29c free to rotate on center tube 30 pinned at either end 31 through mounting plugs 32 to stationary brackets 33. Torsion spring 34 anchored to center tube 30 by rivet 35 has its other end 36 straightened in a longitudinal projection anchored in channel 37 formed in the outer surface of bearing 29a which also serves as a drive connection for a channel indentation in end 38 of roller tube 28.

The inner end of tonneau cover C, omitted in FIG. 5, is secured to roller tube 28 by suitable means known in the art such as a series of pop rivets. Mounting brackets 33 secured to end caps 39 are installed on cover 40 under sufficient preload windup to torsion spring 34 with cover C fully retracted to assure full windup of the tonneau cover upon release.

Figure 3:
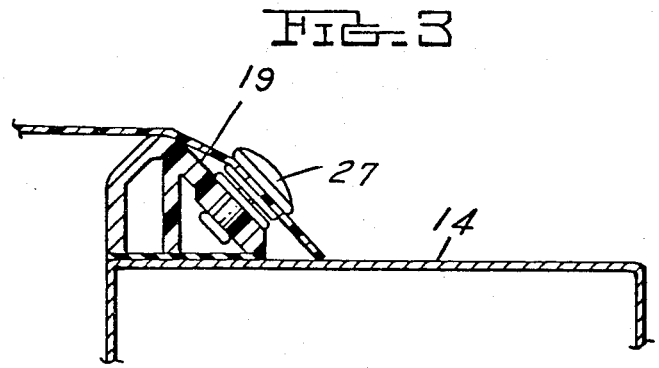
FIG. 3 is an enlarged sectional view of the box side rail taken through one of the snaps.
Figure 4:
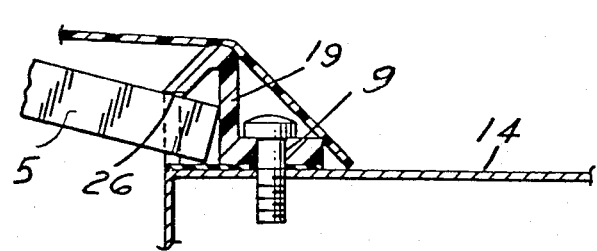
FIG. 4 is a view similar to FIG. 3 taken through one of the rail attachment bolts.
Figure 6:
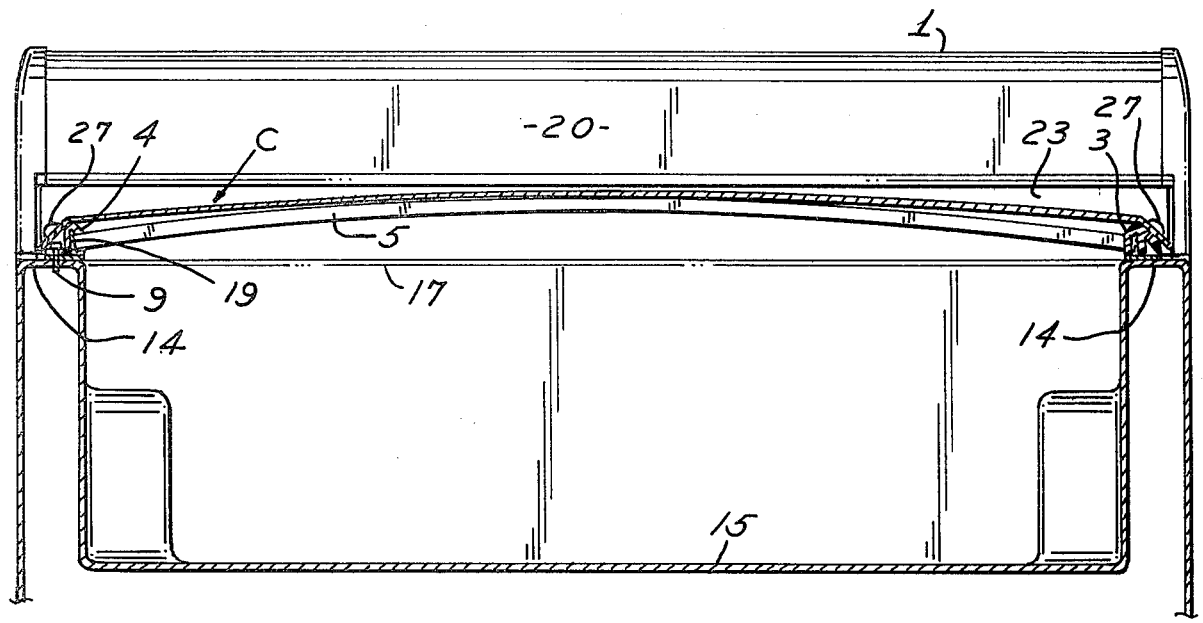
FIG. 6 is a transverse sectional view of the components illustrated in FIG. 1 shown in assembled relation.

With reference to FIG. 6 the transverse sectional view is staggered through the center of one of the support bows 5 at the left hand side of the figure, corresponding to enlarged fragmentary FIG. 4 showing the opposite end, and passing through one of the intermediate snaps 27 at the right hand side of the figure corresponding to enlarged fragmentary FIG. 3.

Figure 7:
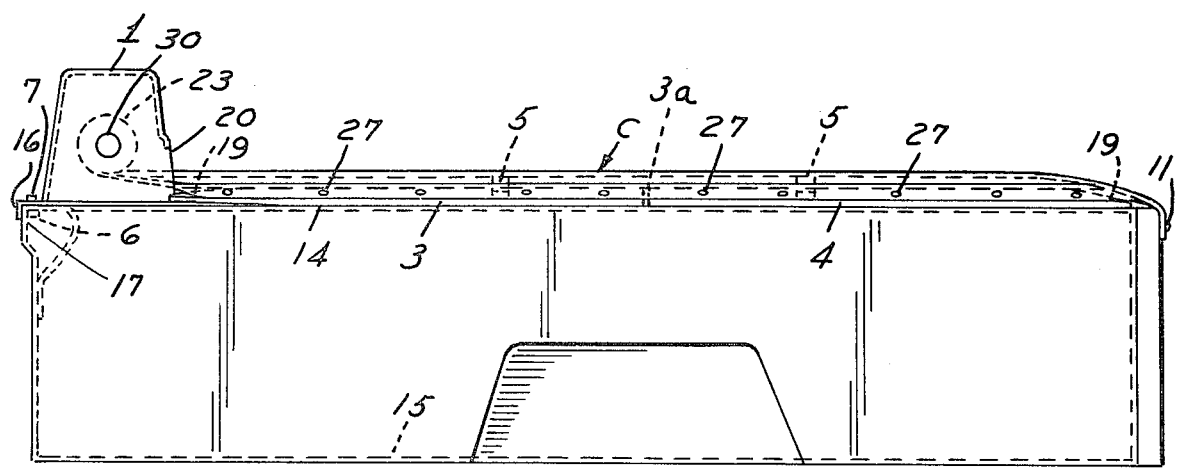
FIG. 7 is a side elevation of the assembly illustrated in FIG. 6.

With reference to FIG. 7 the side elevation shows the cover C in extended covering position with snaps 27 engaged as shown in FIGS. 3 and 6.

The completed installation provides a conveniently installed tonneau cover which is easily pulled out and snapped on for a weatherproof cover with the housing completing a front end seal for the box of the pickup truck; and which is readily unsnapped and released for automatic windup storage.

We claim:

1. Tonneau cover kit for open box of pickup truck comprising a front end transverse housing assembly, means for weather-sealed installation of said assembly at the front end of said box, flexible tonneau cover and spring windup roller means intalled within said housing assembly, side snap rail means for superimposed installation by attachment to the top of box side walls along the box sides, said rail means including provision for installing removable tonneau supports intermediate the ends and sides of the box, and interengaging snap means between the side margins of said cover and said snap rail means.

2. Tonneau cover kit of claim 1 including transverse upward bow means for supporting the flexible tonneau cover only at positions intermediate the ends of the box.

3. Tonneau cover kit of claim 2 including removable bow pockets in said side snap rail means.

* * * * *